March 19, 1946. H. J. PASSINO 2,396,966
HYDROCARBON CONVERSION
Original Filed May 31, 1941
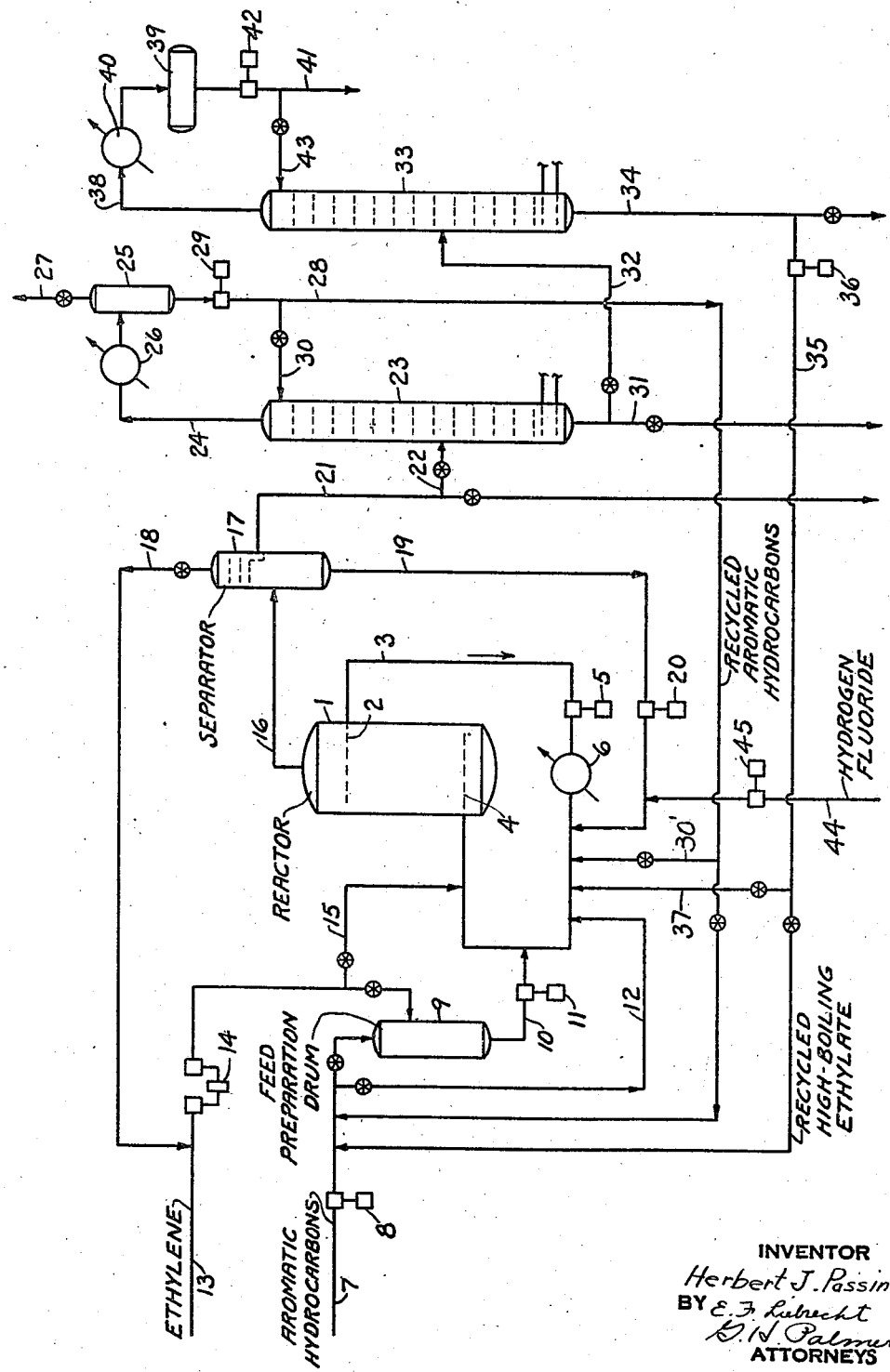
INVENTOR
*Herbert J. Passino*
BY *E. F. Lutrecht*
*D. N. Palmer*
ATTORNEYS Patented Mar. 19, 1946

2,396,966

UNITED STATES PATENT OFFICE 2,396,966

HYDROCARBON CONVERSION

Herbert J. Passino, Englewood, N. J., assignor to The M. W. Kellogg Company, Jersey City, N. J., a corporation of Delaware Original application May 31, 1941, Serial No. 395,973. Divided and this application May 1, 1945, Serial No. 591,273

8 Claims. (Cl. 260—671)

This invention relates to the ethylation of aromatic hydrocarbons with ethylene. More particularly, the invention relates to the ethylation of relatively low-boiling aromatic hydrocarbons such as benzene, toluene and the xylenes with ethylene in the presence of a catalyst essentially consisting of hydrogen fluoride.

While the catalyst employed in my invention consists essentially of hydrogen fluoride, minor amounts of other materials may be employed in connection with the hydrogen fluoride as promoter therefor such as small amounts of boron fluoride or nickel. I prefer to carry out the process under conditions of temperature and pressure under which the hydrogen fluoride is in the liquid state although the use of hydrogen fluoride in the vapor form is not excluded from the scope of the invention.

In carrying out my invention an aromatic hydrocarbon, or a mixture of aromatic hydrocarbons, or a mixture of hydrocarbons containing an aromatic hydrocarbon to be ethylated, is intimately contacted with ethylene and hydrogen fluoride at a temperature not substantially lower than 50° F. and under a pressure not substantially lower than 200 pounds per square inch for a time sufficient to effect the desired ethylation.

While the foregoing temperatures and pressures represent substantially minimum values, higher temperatures and higher pressures may be employed with advantage. The maximum permissible temperature is governed by the tendency of the ethylene to polymerize, but it is found that temperatures up to 200° F. may be employed with advantage. The maximum permissible pressure also is affected by the tendency of the ethylene to polymerize, although this effect is probably not so noticeable as in connection with the use of high temperatures. Pressures up to 3000 pounds per square inch may be employed without excessive polymerization of ethylene, although the use of higher pressures is not excluded from the scope of my invention. Inasmuch as the speed of the desired reaction is promoted by high temperature and especially by high pressure, it is desirable to employ as high a pressure and as high a temperature as is practical or permissible.

It is desirable also to maintain the molar ratio of aromatic reactants to ethylene in the reaction zone not substantially lower than 1:1, and preferably this ratio should be at least 10:1.

The quantity of hydrogen fluoride which should be used in relation to the quantities of hydrocarbons in the reaction zone is not critical, but a sufficient volume in relation to the volume of hydrocarbons which are present should be maintained to permit intimate mixing and dispersion of the hydrocarbons and hydrogen fluoride. Suitably, the reaction may be carried out by intimately contacting gaseous ethylene with a mixture of liquid hydrocarbons containing the aromatic hydrocarbon to be ethylated and hydrogen fluoride. Conveniently, the reaction is carried out in the liquid phase in a continuous manner in which a body of emulsion of liquid hydrocarbons and hydrogen fluoride is maintained in contact with ethylene. A portion of this body of emulsion is withdrawn continuously for recovery of ethylated product, and fresh supplies of hydrocarbon reactants are added continuously to the reaction zone in the proportions necessary to maintain the desired molar of aromatic hydrocarbons to ethylene. The hydrocarbons withdrawn from the reaction zone are fractionated if desired to separate fractions suitable for recycling and fractions containing the ethylated product.

The hydrocarbons withdrawn from the reaction zone may be substantially separated from hydrogen fluoride prior to withdrawal, or a mixture of catalyst and hydrocarbons may be withdrawn from the reaction zone. Such a mixture is separated by settling and drawing off the supernatant hydrocarbon layer, leaving the hydrogen fluoride to be recycled to the reaction zone. The hydrocarbons withdrawn from the reaction zone are fractionated if desired to separate fractions suitable for recycling and fractions containing the ethylated product. The ethylate may if desired be neutralized with a caustic solution to effect removal of residual amounts of hydrogen fluoride. Hydrogen fluoride withdrawn from the reaction zone is replaced by the continuous or periodical addition to the reaction zone of recycled or fresh hydrogen fluoride.

The invention will be described further by reference to examples of the application of the process to the ethylation of benzene. It is to be understood, however, that the invention is not limited by reference to the ethylation of benzene but includes within its scope the treatment of any suitable aromatic hydrocarbon, particularly low-boiling aromatic hydrocarbons such as benzene, toluene and the xylenes.

Example I

Benzene, hydrogen fluoride and ethylene were charged to a shaker bomb at a pressure of 500 pounds. The hydrogen fluoride was equivalent to approximately 12 per cent of the benzene, and the molar ratio of benzene to ethylene was approximately 2:1. However, since only a part of the ethylene in the bomb was contained in the benzene-hydrogen fluoride mixture the molar ratio of benzene to ethylene in the liquid mixture was substantially higher than 2:1. The mixture was agitated at a temperature of 70 to 80° F. for a period of 16 hours during which time the pressure on the bomb declined from the initial pressure of 500 pounds to a final pressure of 200 pounds. The liquid products were separated by distillation to recover an ethyl benzene product equivalent to approximately 10 weight per cent of the benzene charged and equivalent to a conversion of 16 weight per cent of the ethylene charged.

In carrying out my process on individual aromatic hydrocarbons or mixtures of aromatic hydrocarbons or hydrocarbon mixtures containing an aromatic hydrocarbon undesired high-boiling products may be formed, as by di-ethylation. Such high-boiling products may be separated from the hydrocarbon product by fractionation and returned to the reaction zone for conversion to the desired ethylated hydrocarbon by dealkylation reactions. For example, in the ethylation of benzene the ethylate may be fractionated to separate hydrocarbons higher boiling than ethyl benzene (e. g. diethyl benzenes), and the latter may be recycled to the reaction zone for conversion to ethyl benzene.

Example II

A light naphtha containing 18 per cent benzene was subjected to ethylation in accordance with the present invention in two test runs.

In run No. 1 a mixture of the light naphtha, hydrogen fluoride and ethylene was charged to a shaker bomb at a pressure of 850 pounds. The quantity of ethylene charged to the shaker bomb produced a pressure of 210 pounds per square inch, and nitrogen was charged to the bomb to produce the operating pressure of 850 pounds per square inch. The hydrogen fluoride was equivalent to approximately 15 weight per cent of the light naphtha. The molar of benzene to ethylene in the bomb was between 1:1 and 2:1, but a substantially higher ratio existed in the liquid mixture containing the catalyst. In this run the reaction mixture was maintained with agitation at a temperature of 70 to 80° F. for a contact time of 2.5 hours during which time the pressure declined to a final pressure of 530 pounds per square inch.

In run No. 2 a mixture of a light naphtha, hydrogen fluoride and ethylene was charged to a shaker bomb at a pressure of 810 pounds. The hydrogen fluoride present in the bomb was equivalent to approximately 15 weight per cent of the light naphtha. The molar ratio of the benzene to ethylene in the bomb was approximately 3:5, but since only a part of the ethylene present in the bomb was contained in the liquid mixture of the catalyst and naphtha the ratio of benzene to ethylene in the liquid mitxure was substantially higher than 2:1. The mixture was maintained with agitation at a temperature of 80 to 85° F. during an operating run of three hours in which time the pressure on the bomb declined to a final pressure of 560 pounds per square inch.

Substantial ethylation of the benzene contained in the light naphtha in these two runs is indicated by a comparison of the A. S. T. M. distillation analyses of the liquid products of the light naphtha, which were as follows:

|  | Feed | Run No. 1 | Run No. 2 |
| --- | --- | --- | --- |
|  | °F. | °F. | °F. |
| Initial boiling point | 90 | 108 | 86 |
| 10% off at | 119 | 137 | 124 |
| 50% off at | 157 | 166 | 162 |
| 90% off at | 187 | 245 | 294 |
| End boiling point | 212 | 528 | 489 |

The invention will be described further by reference, for purpose of illustration, to the accompanying drawing which is a diagrammatic view in elevation of an embodiment of an apparatus suitable for carrying out the new process.

Referring to the drawing, a substantially liquid mixture of hydrogen fluoride, a hydrocarbon liquid containing a substantial proportion of an aromatic hydrocarbon to be ethylated, and ethylene are maintained in reactor 1. The mixture is continuously agitated by any suitable means to effect intimate mixing of the reactants and hydrogen fluoride, which results in the formation of an emulsion of the liquid hydrocarbons and hydrogen fluoride. Conveniently, agitation is effected by withdrawing a portion of the mixture from the upper part of reactor 1 as through collecting means 2 and recirculating the mixture thus withdrawn through line 3 into distributing element 4 located in the lower portion of reactor 1. Line 3 is provided with a pump 5, and distributing element 4 is provided with suitable injection means for introducing the recirculated mixture in a plurality of jets whereby the body of reactants and hydrogen fluoride in reactor 1 is violently agitated, and intimate mixing of the reactants and catalyst is effected. In operations at relatively low temperature the heat developed by the exothermic ethylation reaction may necessitate the provision of means for cooling the reaction mixture to maintain the reaction temperature at the desired level. To effect such cooling any suitable means for refrigerating the reaction mixture by indirect heat exchange may be provided. Conveniently, cooling is effected by passing the mixture circulated through line 3 through cooling means 6 located preferably in line 3 between pump 5 and distributing element 4. In operations at higher temperatures simpler means may be sufficient to cool the reaction mixture to the necessary degree, and it may be necessary to supply heat to maintain a desired relatively high reaction temperature.

Aromatic hydrocarbons are introduced into the system through line 7 provided with a pump 8. Line 7 connects with a feed preparation drum 9 from which the aromatic hydrocarbons are withdrawn through line 10 provided with pump 11. Line 10 connects with line 3 whereby material passing therethrough is introduced into reactor 1 through the jets described above. Alternatively, the aromatic hydrocarbons introduced into the system through line 7 may be introduced directly into line 3. For this purpose a separate line 12 is provided which connects line 7 directly with line 3.

Ethylene to be employed in the process is introduced into the system through line 13 provided with a compressor 14. Line 13 connects with feed preparation drum 9 whereby ethylene thus introduced is brought into intimate contact with the aromatic hydrocarbons in drum 9 by any suitable gas and liquid contact means. Ethylene is thus introduced into feed preparation drum 9 in an amount which will be dissolved in the aromatic hydrocarbons. The extent to which ethylene will dissolve in the liquid hydrocarbons in drum 9 depends upon the pressure maintained thereon by pump 8 and compressor 14. By controlling this pressure the quantity of ethylene passed to reactor 1 through line 10 may be controlled. Alternatively, ethylene may be introduced directly into line 3 in the desired amount, and for this purpose line 15 is provided to connect line 13 directly with line 3. Alternatively, ethylene may be introduced into the reaction zone through drum 9 as well as through line 15.

A portion of the reaction mixture equivalent to the quantity of charge materials introduced through lines 10, 12 and 15 is withdrawn continuously from reactor 1 through line 16. Preferably, the point of withdrawal of reaction mixture through line 16 is located somewhat above the collecting means 2 whereby preliminary separation of hydrogen fluoride from the hydrocarbon phase of the emulsion may be effected in the portion of the reactor above collecting means 2. By this means the material withdrawn through line 16 contains a substantially smaller proportion of hydrogen fluoride than the mixture in the reactor as a whole, thus reducing the amount of hydrogen fluoride which must be recycled.

The reaction mixture withdrawn through line 16 is introduced at reduced pressure into a separator 17. In separator 17 ethylene absorbed in the reaction mixture is separated and withdrawn overhead through line 18 which may connect with line 13 for recycling ethylene thus obtained to the process. Separator 17 also may function as a settler whereby any hydrogen fluoride introduced therein as part of the mixture collects in the lower portion thereof. Hydrogen fluoride thus separated is withdrawn through line 19 which is provided with a pump 20 and connects with line 3 for recycling this hydrogen fluoride to the reaction zone. The liquid hydrocarbon content of the mixture in separator 17 collects as an upper phase and is withdrawn through line 21 through which this material, containing the ethylate product of the process, may be withdrawn from the system. Preferably, however, all or a portion of this material is diverted through line 22 which connects with a fractionator 23.

Fractionator 23 is operated to separate a condensate higher boiling than the charge material and containing the ethylate product of the process. The lower-boiling materials, including unreacted aromatic hydrocarbons and any accompanying non-aromatic constituents of the charge, are withdrawn overhead as a vapor through line 24 which connects to a drum 25. Line 24 is provided with cooling means 26 to effect condensation of the hydrocarbons, which are collected in drum 25. Drum 25 is provided with a gas outlet 27 for removal of any ethylene separated in drum 25. Material withdrawn through line 27 may be removed from the system or recycled to the reaction zone as desired. The condensate collected in drum 25 is withdrawn therefrom through line 28 provided with a pump 29. A portion of this condensate is diverted through line 30 for introduction into the top of fractionator 23 as reflux. Line 28 connects with line 7 whereby unconverted aromatic hydrocarbons may be recycled to the reaction zone for further ethylation treatment. Inasmuch as the preferred operation of the process provides for the maintenance of aromatic reactants in reactor 1 in a substantial excess of the amount required to react with the ethylene introduced therein, a substantial quantity of aromatic hydrocarbons is recycled through line 28. Alternatively, material thus recycled may be introduced directly into line 3. For this purpose line 30' is provided to connect line 28 directly with line 3.

The condensate collected in fractionator 23, containing the ethylate product of the process, is withdrawn through line 31, through which line it may be withdrawn from the process. Preferably, however, all or a portion of this condensate is diverted from line 31 through line 32 which connects with a second fractionator 33.

Fractionator 33 is operated under conditions of temperature and pressure effective to separate the ethylate product in any desired manner. For example, in the ethylation of benzene fractionator 33 may be operated under conditions effective to separate as a condensate hydrocarbons higher boiling than ethyl benzene such as diethyl benzene. While these materials may constitute a separate product of the process it is advantageous to recycle them to the reaction zone for conversion to the lower-boiling ethylate aromatic hydrocarbon by disproportionation reactions such as de-ethylation. For this purpose line 35, provided with pump 36, is provided to connect line 34 with line 7. Alternatively, high-boiling materials thus recycled may be introduced directly into line 3. For this purpose line 37 is provided to connect line 35 to line 3.

The lower-boiling ethylate product of the process is separated in fractionator 33 as a vapor and withdrawn therefrom through line 38 which connects with drum 39. Line 38 is provided with cooling means 40 to effect condensation of the hydrocarbons passing therethrough. The condensate thus obtained collects in drum 39 and is withdrawn therefrom through line 41 provided with a pump 42. A portion of this condensate is recycled to the upper portion of fractionator 33 as reflux through line 43.

The hydrocarbon products withdrawn from the process preferably are subjected to further treatment such as a caustic wash to remove residual quantities of hydrogen fluoride which may remain therein.

A portion of the reaction mixture circulating through line 13 to line 3 may be withdrawn by means not shown to a settler from which the hydrocarbon phase is returned to line 3. The hydrogen fluoride separated in the settler may be withdrawn from the process or may be subjected to revivification treatment.

To replace hydrogen fluoride lost or withdrawn from the process line 44 provided with pump 45 is provided for the introduction of fresh hydrogen fluoride into line 19 and thereby into line 3.

Instead of a reaction chamber of the general type illustrated in the drawing the liquid reactants may be contacted by any other suitable means. For example, the liquid mixture may be passed through an elongated reaction zone of restricted cross-sectional area such as a pipe coil, the velocity of flow being relied upon to maintain the mixture. The use of a pipe coil is particularly advantageous in carrying out the reaction under vapor phase conditions.

In liquid phase operations it is feasible to dissolve in the reaction mixture the quantity of ethylene required. However, mixed phase operations wherein ethylene is present in the reaction zone as a gas are within the scope of the invention.

This application is a division of application Serial No. 395,973, filed May 31, 1941.

I claim:

1. A process for converting a polyalkyl aromatic hydrocarbon to an alkyl aromatic hydrocarbon having a fewer number of alkyl groups per molecule, which comprises treating a polyalkyl aromatic hydrocarbon in admixture with a substantial molecular excess of an aromatic hydrocarbon having at least two alkyl groups per molecule fewer than said polyalkyl aromatic hydrocarbon and in the presence of hydrofluoric acid as the effective catalyst to produce an alkyl aromatic hydrocarbon having fewer alkyl groups per molecule than said polyalkyl aromatic hydrocarbon, and recovering from effluents of said treatment an alkyl aromatic hydrocarbon so produced.

2. A process for converting a polyalkyl aromatic hydrocarbon to an alkyl aromatic hydrocarbon having a fewer number of alkyl groups per molecule, which comprises treating a polyalkyl aromatic hydrocarbon in admixture with a substantial molecular excess of an aromatic hydrocarbon having at least two alkyl groups per molecule fewer than said polyalkyl aromatic hydrocarbon and in the presence of hydrofluoric acid as the effective catalyst and a small amount of a nickel promoter to produce an alkyl aromatic hydrocarbon having fewer alkyl groups per molecule than said polyalkyl aromatic hydrocarbon, and recovering from effluents of said treatment an alkyl aromatic hydrocarbon so produced.

3. A process for converting a polyalkyl aromatic hydrocarbon to an alkyl aromatic hydrocarbon having a fewer number of alkyl groups per molecule, which comprises treating a polyalkyl aromatic hydrocarbon in admixture with a substantial molecular excess of an aromatic hydrocarbon having at least two alkyl groups per molecule fewer than said polyalkyl aromatic hydrocarbon and in the presence of liquid hydrofluoric acid as the effective catalyst to produce an alkyl aromatic hydrocarbon having fewer alkyl groups per molecule than said polyalkyl aromatic hydrocarbon, and recovering from effluents of said treatment an alkyl aromatic hydrocarbon so produced.

4. A process for converting a polyalkyl aromatic hydrocarbon to an alkyl aromatic hydrocarbon having a fewer number of alkyl groups per molecule, which comprises treating a polyalkyl aromatic hydrocarbon in admixture with a substantial molecular excess of an aromatic hydrocarbon having at least two alkyl groups per molecule fewer than said polyalkyl aromatic hydrocarbon at a temperature not substantially lower than 50° F. and in the presence of hydrofluoric acid as the effective catalyst to produce an alkyl aromatic hydrocarbon having fewer alkyl groups per molecule than said polyalkyl aromatic hydrocarbon, and recovering from effluents of said treatment an alkyl aromatic hydrocarbon so produced.

5. A process for converting a polyalkyl aromatic hydrocarbon to an alkyl aromatic hydrocarbon having a fewer number of alkyl groups per molecule, which comprises treating a polyalkyl aromatic hydrocarbon in admixture with a substantial molecular excess of an aromatic hydrocarbon having at least two alkyl groups per molecule fewer than said polyalkyl aromatic hydrocarbon under a pressure not substantially lower than 200 pounds per square inch and in the presence of hydrofluoric acid as the effective catalyst to produce an alkyl aromatic hydrocarbon having fewer alkyl groups per molecule than said polyalkyl aromatic hydrocarbon, and recovering from effluents of said treatment an alkyl aromatic hydrocarbon so produced.

6. A process for converting a polyalkyl aromatic hydrocarbon to an alkyl aromatic hydrocarbon having a fewer number of alkyl groups per molecule, which comprises treating a polyalkyl aromatic hydrocarbon in admixture with a substantial molecular excess of benzene and in the presence of hydrofluoric acid as the effective catalyst to produce an alkyl aromatic hydrocarbon having fewer alkyl groups per molecule than said polyalkyl aromatic hydrocarbon, and recovering from effluents of said treatment an alkyl aromatic hydrocarbon so produced.

7. A process for converting a poly-ethyl benzene to an ethyl benzene having a fewer number of ethyl groups per molecule, which comprises treating a poly-ethyl benzene in admixture with a substantial molecular excess of an aromatic hydrocarbon having at least two ethyl groups per molecule fewer than said poly-ethyl benzene and in the presence of hydrofluoric acid as the effective catalyst to produce an ethyl benzene having fewer ethyl groups per molecule than said poly-ethyl benzene, and recovering from effluents of said treatment an ethyl benzene hydrocarbon so produced.

8. A process for converting a poly-ethyl benzene to mono-ethyl benzene which comprises treating a poly-ethyl benzene in admixture with a substantial molecular excess of benzene and in the presence of hydrofluoric acid as the effective catalyst to produce mono-ethyl benzene, and recovering from effluents of said treatment mono-ethyl benzene so produced.

HERBERT J. PASSINO.